Aug. 4, 1970     H. W. JOHANNSEN     3,522,989

TRAY FOR PHOTOGRAPHIC TRANSPARENCIES

Filed Nov. 21, 1967     3 Sheets-Sheet 1

Inventor:
Hans Werner Johannsen
By Michael S. Striker
Attorney

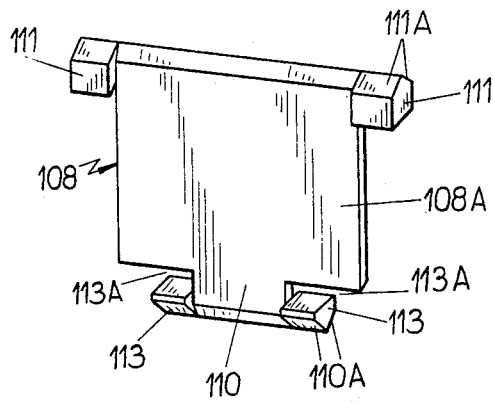
Fig. 4
Fig. 5
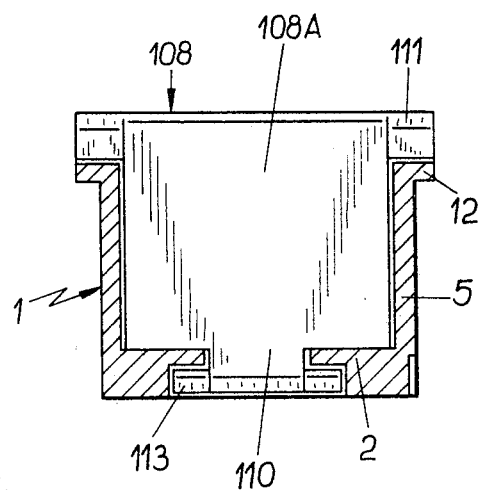
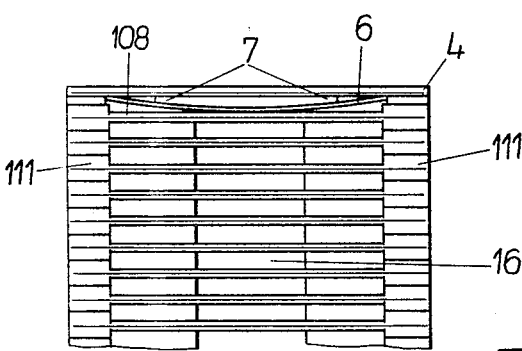
Fig. 6
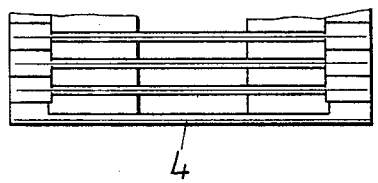

United States Patent Office 3,522,989
Patented Aug. 4, 1970

3,522,989
TRAY FOR PHOTOGRAPHIC TRANSPARENCIES
Hans Werner Johannsen, Frankfurt am Main, Germany, assignor to Braun Aktiengesellschaft, Frankfurt am Main, Germany
Filed Nov. 21, 1967, Ser. No. 684,857
Claims priority, application Germany, Nov. 29, 1966, 1,547,186
Int. Cl. G03b 23/04
U.S. Cl. 353—116   22 Claims

ABSTRACT OF THE DISCLOSURE

A tray for photographic transparencies wherein the housing accommodates removable partitions which are shiftable longitudinally of the internal space in the housing and define compartments for transparencies. The partitions are provided with projections which extend downwardly through a slot in the bottom wall of the housing and can be engaged by a detector in the slide projector to locate successive or selected transparencies in the projection plane. The compartments may accommodate thick and/or thin transparencies including those installed in cardboard or plastic frames as well as those installed between glass panels.

The package of transparencies and partitions is condensed by one or more springs which operate between the housing and one or both outermost partitions. Each partition can be introduced into or withdrawn from the internal space in response to movement to a predetermined position at the one and/or the other end of the housing.

BACKGROUND OF THE INVENTION

The present invention relates to improvements in magazines or trays which are used to accommodate photographic transparencies of the type commonly known as slides.

As a rule, a tray comprises a housing provided with permanently installed or integral partitions which define a series of compartments each adapted to accommodate a slide. The housing is normally provided with a rack or the like which can be engaged by the pinion of the transporting mechanism in a slide projector to move the tray stepwise and to place successive or selected slides into a projection plane. A slide changer of the projector then removes the slide from the respective compartment and moves it into registry with the optical system and into the path of light issuing from the projection lamp so that the image of the transparency is projected onto a screen. The width of compartments in conventional trays is selected in such a way that each compartment can accommodate a very thick or a very thin slide. Thin slides normally comprise a frame made of plastic or cardboard which encloses the marginal portions of the image-bearing transparency. A relatively thick slide normally comprises a frame wherein a glass panel flanks the transparency at each side. The width of each compartment must suffice to permit unobstructed insertion or withdrawal of thickest slides in order to prevent jamming when the tray is inserted into and transported with reference to the slide projector. Thus, trays of the just outlined type can be used with maximum economy in space only when each of their compartmemnts accommodates a thick slide; otherwise, the volume of the tray is used to less than capacity and each relatively thin slide is free to wobble in the respective compartment.

It was already proposed to provide trays with permanently installed or integral portions which define a large number of relatively narrow compartments or a relatively small number of wide compartments, i.e., to provide special trays for thin slides and to use normal trays for thick slides. As a rule, a special tray for thin slides is of the same length as but contains about twice as many compartments as a normal tray for thick slides. A serious drawback of such proposal is that a special tray cannot receive thick slides and that a normal tray receives thin slides with excessive play. Thus, and if a lecturer assembles a series of slides which include thick and thin slides in random distribution and if such slides must be projected in a sequence in which thin slides alternate with thick slides, the operator can resort only to a normal tray but cannot use special trays because such special trays cannot accommodate thick slides. Furthermore, a slide projector which is to be used with special and normal trays must be provided with a special slide changing mechanism which is capable of properly transporting trays with closely adjacent or widely spaced partitions. Still further, even a special tray which is specifically designed to accommodate thin slides is not used economically because a certain amount of clearance must remain between each inserted slide and the adjoining permanent partitions in order to account for eventual variations in thickness of slides and to prevent excessive wear upon or eventual damage to the frames of slides. Therefore, slide projectors which use two types of trays including those specially designed for thin slides and normal trays designed to accommodate thin and/or thick slides have met with little commercial success.

SUMMARY OF THE INVENTION

It is an object of my invention to provide a novel and improved magazine or tray for slides or like photographic transparencies and to construct and assemble the tray in such a way that it can be used for storage and projection of thin, thick or medium thick slides.

Another object of the invention is to provide a slide projector wherein all types of slides can be received with the same amount of clearance irrespective of their thickness.

A further object of the invention is to provide a tray which can be used in conventional slide projectors.

An additional object of my invention is to provide a tray which can accommodate a larger number of slides than presently known trays even though its overall length need not exceed the length of a conventional tray.

Still another object of the invention is to provide a tray wherein the partitions can be distributed at the will of the user.

A concomitant object of the invention is to provide a tray wherein the partitions can be used as a means for facilitating proper positioning of selected slides in the projection plane of a slide projector.

An ancillary object of the invention is to provide a novel housing and novel partitions for use in a tray for slides or the like.

My invention is embodied in a magazine or tray for framed photographic transparencies or slides which comprises a housing defining an elongated space, and a plurality of partitions removably received in the housing and extending transversely of the space therein to define between themselves compartments for reception of slides. The partitions are movable lengthwise of the space and the tray is preferably provided with suitable compacting or condensing means operating between the housing and at least one outermost partition to bias such outermost partition against the other outermost partition and to thereby reduce the length of the package consisting of partitions and interposed slides to a minimum.

Each partition is further provided with a preferably downwardly extending projection which can be tracked by a suitable detector of a slide projector to properly locate the housing whenever a fresh slide or a selected slide is moved into the projection plane in which it can be moved into registry with the optical system of the projector.

The novel features which are considered as characteristic of the invention are set forth in particular in the appended claims. The improved tray itself, however, both as to its construction and the mode of utilizing the same, together with additional features and advantages thereof, will be best understood upon perusal of the following detailed description of certain specific embodiments with reference to the accompanying drawing.

BRIEF DESCRIPTION OF THE DRAWING

FIG. 4 is a perspective view of a modified partition;

FIG. 5 is a transverse vertical sectional view of a tray containing partitions of the type shown in FIG. 4;

FIG. 6 is a fragmentary top plan view of the tray shown in FIG. 5;

DESCRIPTION OF THE PREFERRED EMBODIMENTS

Figure 1:
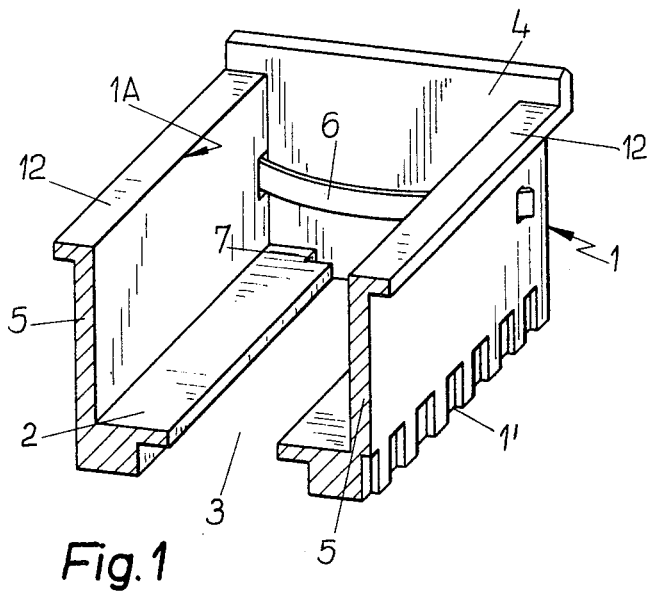
FIG. 1 is a fragmentary perspective view of a tray which embodies my invention, with the partitions removed.
Figure 2:
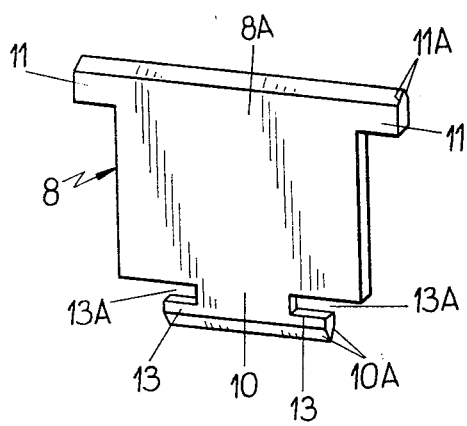
FIG. 2 is a perspective view of a partition.

FIG. 1 shows a portion of a housing or container 1 which forms part of a tray embodying one form of my invention. The housing 1 defines an elongated internal space 1A of constant width. The upper side of the housing 1 is open and the space 1A is bounded by a bottom wall 2 having a longitudinally extending slot 3, by two end walls 4 (only one shown in FIG. 1), and by two elongated parallel side walls 5. The top portions of the side walls 5 have outwardly extending flanges 12 constituting two upper guides for removable partitions 8 one of which is shown in FIG. 2. One of the side walls 5 is provided with teeth 1' together forming an elongated straight rack which can be placed into mesh with the pinion of a transporting mechanism in the slide projector wherein the improved tray is put to use. The bottom wall 2 is further formed with two cutouts 7 (only one shown) which extend laterally from the slot 3 and are adjacent to one end wall 4. A leaf spring 6 whose ends are anchored in the side walls 5 is adjacent to the inner side of the end wall 4 shown in FIG. 1. This spring forms part of or constitutes a condensing or compacting device for a package of partitions 8 and slides 9 (see FIG. 3) to insure that the partitions are biased against each other and/or against the adjoining slides in order to reduce the length of the package to a minimum. The median portion of the spring 6 bulges in a direction away from the inner side of the associated end wall 4 and bears against the adjoining outermost partition 8. The housing 1 is of substantially U-shaped cross-sectional outline.

Referring now to FIG. 2, the partition 8 therein shown is preferably made of suitable synthetic plastic material and comprises a relatively thin flat panel 8A provided with a downwardly extending projection 10 having two laterally extending end portions 13 and being bounded at its lower end by two downwardly converging side faces 10A. Recesses 13A provided in the panel 8A above the end portions 13 can accommodate the adjoining edge portions of the bottom wall 2 when the partition 8 is properly inserted into the housing 1. Such insertion is possible when the partition is moved to a predetermined position with reference to the housing, namely, closely adjacent to the end wall 4 shown in FIG. 1 so that the end portions 13 register with the cutouts 7 in the bottom wall 2.

Insertion of the partition 8 requires deformation of the spring 6. Once the end portions 13 advance downwardly and beyond the cutouts 7, the partition 8 is slid forwardly, as viewed in FIG. 1, so that the edge portions of the bottom wall 2 enter the recesses 13A whereby the partition is properly coupled with but is movable or shiftable in the longitudinal direction of the housing 1. The spring 6 prevents unintentional separation of partitions from the housing, i.e., the user must deform the spring 6 in order to move a partition to the aforementioned predetermined position prior to withdrawal of such partition from the space 1A.

An additional purpose of the projection 10 is to cooperate with a detector of the slide projector when the housing 1 is inserted into the ways provided therefor in the casing of the projector.

Figure 3:
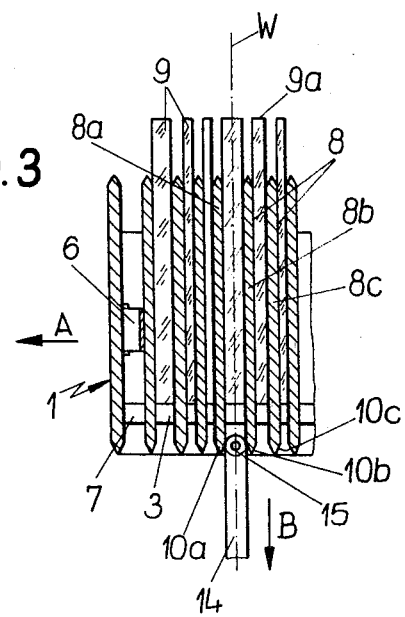
FIG. 3 is a fragmentary vertical longitudinal sectional view of a fully assembled tray containing slides of different thickness.

A package consisting of slides 9 and partitions 8 is shown in FIG. 3 which illustrates the housing 1 in longitudinal vertical section. The partitions 8 define between themselves compartments which accommodate the slides 9 in such a way that the top part of the frame on each slide extends upwardly and beyond the upper parts of the partitions. Such upper parts are provided with spaced laterally extending end portions or arms 11 which overlie and rest on the flanges 12 of the side walls 5. The top part of each partition is further formed with two upwardly converging side faces 11A (best shown in FIG. 2) which define a pointed ridge facilitating insertion of slides 9 into the respective compartments. The side faces 11A extend along the full length of the top part of each partition 8, i.e., all the way across the open upper side of the housing 1.

FIG. 3 further shows a portion of sensing element or detector 14 which is installed in the slide projector. This detector carries a roller 15 which can enter the gaps between the projections 10 of adjoining partitions 8. The detector 14 is movable up and down so that it can yield when the tray is transported forwardly in the direction indicated by the arrow A. The arrow B indicates the direction in which the projection 10 of a partition 8 can move the roller 15 when the housing 1 is advanced in response to rotation of the pinion which meshes with the rack 1'. The character W denotes the projection plane, i.e., that plane in which a selected slide 9 is located when the image on its transparency is projected onto a screen.

For example, and assuming that the housing 1 is held by the pinion in the position shown in FIG. 3. The roller 5 extends into the gap between the projections 10a and 10b of the adjoining partitions 8a and 8b. If the transporting mechanism is then operated to advance the tray in the direction indicated by arrow A, the projection 8b causes the roller 15 and detector 14 to move downwardly (arrow B) but the roller 15 returns to the illustrated position and enters the gap between the projections 10b and 10c when the slide 9a is moved into the projection plan W. The projection 10c forms part of the partition 8c. Downward movements of the roller 15 are facilitated by the inclined side faces 10A of projections on the partitions 8. The arrangement may be such that the roller 15 serves as a means for arresting the tray when a fresh slide (e.g., the slide 9a) enters the plane W. This can be achieved if the detector 14 is operatively connected with the transporting mechanism and can arrest the pinion as soon as the roller 15 assumes its upper end position. However, it is equally possible to advance the tray by increments of identical length and to compensate for different thicknesses of slide frames by using the roller 15 as a means for properly centering a fresh slide in the plane W upon completed stepwise advance of the tray. In such slide projectors, the motor must be connected with the pinion by means of a suitable slip clutch which permits movements of the tray under the action of the roller 15 when the motor is arrested or even at a time when the motor tends to rotate the pinion when meshes with the rack 1'.

The detector 14 and its roller 15 may be utilized as a means for ejecting from the housing 1 that slide which is located in the projection plane W. Such ejection may be partial or complete, i.e., the image on the transparency of a slide can be projected onto a screen when the slide is partially expelled from the respective compartment, or the projector is provided with a slide changer serving as a means for completely withdrawing a slide from the space 1A and for thereupon moving the thus withdrawn slide into registry with the optical system and projection lamp. In the first instance, the projector is normally provided with a pusher or the like to return a partially ejected slide into the respective compartment upon completion of a projection. If the slide is fully expelled from its compartment, the side faces 11A on the upper parts of the adjoining partitions 8 facilitate its reintroduction into an empty compartment. In the second instance, the detector 14 raises a selected slide above the housing 1 and into the range of the slide changer which thereupon transports the raised slide into requisite position for projection of its image. Reinsertion of the slide is effected by the slide changer or by a special pusher.

FIG. 4 illustrates a modified partition 108. The upper part of the partition 108 is provided with two spaced end portions or arms 111 whose thickness exceeds the thickness of the panel 108A. The upwardly converging side faces 111A extend along the full width of the top part. The projection 110 of the partition 108 comprises two end portions 113 whose thickness is the same as that of the end portions 111 and exceeds the thickness of the central portion of the projection 110. The side faces 110A extend along the full width of the projection 110 and the partition 108 is again provided with two recesses 113A located above the end portions 113 and serving the same purpose as the aforedescribed recesses 13A. The manner in which a properly inserted partition 108 is supported by the housing 1 of a tray is shown in FIG. 5. FIG. 6 shows that the end portions 111 of adjoining partitions 108 abut against each other to define compartments 16 of minimum width which suffices to accommodate relatively thin normal slides whose frames consist of cardboard or plastic. Thus, such relatively thin slides (whose thickness corresponds to that of three thinnest slides shown in FIG. 3) can be readily inserted into or withdrawn from the compartments 16 with no friction or with a minimum of friction so that their frames are subjected to negligible wear. The upper end portions 111 rest on and are slidable along the flanges 12 of the side walls 5. The lower end portions 113 are movable along the underside of the bottom wall 2 adjacent to the lateral sides of the slot 3. Furthermore, the projections 110 cooperate with the roller 15 of a detector 14 in the same way as described in connection with FIG. 3. The upper side faces 111A facilitate insertion of relatively thick slides of the type comprising a frame made of glass or the like. Three relatively thick slides 9 are shown in FIG. 3. Such spreading of partitions 108 will become necessary when the thickness of a slide 9 exceeds the width of a compartment 16.

As stated before, the aforementioned leaf spring 6 forms part of or constitutes a condensing or compacting device which reduces the overall length of a package of slides 9 and partitions 8 or 108 to a minimum. The spring 6 suffices if the housing 1 is completely or almost completely filled with slides and partitions. However, if the length of a condensed package is considerably less than the length of the space 1A in the housing 1, the latter is preferably provided with two leaf springs 6, each adjacent to the inner side of one of the end walls 4. It is clear that the leaf springs 6 can be replaced by helical springs or by other suitable resilient biasing means which can yield when the length of the package increases. Furthermore, it is equally clear that the housing 1 can be provided with two pairs of cutouts 7 with one pair adjacent to each end wall 4 so that a partition 8 or 108 can be withdrawn by assuming a predetermined position at either end of the space 1A.

The partitions 108 are particularly suited to prevent damage to relatively thin slides whose frames consist of cardboard or plastic. The end portions 111, 113 insure that the width of compartments 16 cannot be reduced below a predetermined minimum value which suffices to permit convenient insertion or withdrawal of thinnest slides. The width of compartments 16 is preferably such that they can receive a conventional slide having a cardboard frame with a minimal clearance which suffices to permit insertion or withdrawal of the frame without appreciable friction or without any friction. If the housing 1 accommodates partitions 108 of the type shown in FIGS. 4 to 6, the diameter of the roller 15 which cooperates with the tray is selected in such a way that the roller spreads the partitions flanking a thick slide which is located in the projection plane W so that the thick slide, too, can be inserted or withdrawn without friction. When the roller 15 is moved upwardly to engage the adjoining side faces 113A of two projections 110, the respective partitions 108 are moved apart to provide a compartment whose width exceeds the thickness of the thickest slide (e.g., a slide wherein the transparency is received between two glass panels). The width of the thus enlarged compartment preferably suffices to permit entry of a slide changer which grips the slide and moves the thus gripped slide into registry with the optical system of the projector.

The provision of one or more condensing devices in the tray of my invention is of particular importance when the housing 1 accommodates partitions of the type shown in FIG. 4 and is arranged to accommodate thin and/or thick slides, particularly thick slides. When the roller 15 is caused to move upwardly and to widen that compartment 16 which is located in the projection plane W, the adjoining partitions 108 must have room to yield in the longitudinal direction of the housing 1 and to permit widening of the respective compartment. On the other hand, it is desirable to accommodate the slides with a minimal clearance in order to prevent tilting of slides with reference to a vertical plane because such tilting would interfere with proper operation of the slide changer whose slide-engaging part or parts are mounted for movement in a predetermined plane and can properly engage the frame of a slide only if such slide is held in a substantially vertical plane. A minimal clearance is insured by the provision of one or more condensing devices.

If the length of a package consisting of partitions 8 or 108 and interposed slides 9 is considerably less than the length of the space 1A, the length of the package can be increased by inserting a certain number of spare partitions to insure that a single leaf spring 6 or two such leaf springs suffice to bias the two outermost partitions 8 or 108 toward each other. However, the insertion of spare partitions for the sole purpose of increasing the overall length of the package can be avoided if the aforementioned condensing or compacting device comprises one or two leaf springs 6 and/or additional or auxiliary condensing members or fillers of the type shown in FIGS. 7 or 8.

Figure 7:
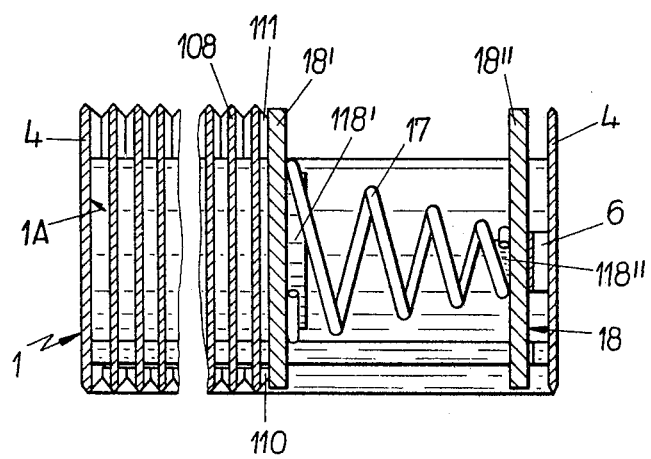
FIG. 7 is a fragmentary longitudinal vertical sectional view of the tray shown in FIG. 5 or 6.

In FIG. 7, the auxiliary condensing member or filler 18 comprises two auxiliary partitions 18', 18" which are insertable in the same way as a partition 8 or 108 and which are connected with the end convolutions of a helical expansion spring 17. The leaf spring 6 shown in FIG. 7 operates between the partition 18" and the right-hand end wall 4 of the housing 1. The partition 18' is biased against the rightmost partition 108. The end convolutions of the spring 17 are slipped onto centrally located bosses 118', 118" of the partitions 18', 18". The housing 1 can accommodate two fillers 18, one at each longitudinal end of the space 1A. However, one filler normally suffices and the use of a single filler is more desirable because the leftmost slide is then immediately adjacent to the left-hand end wall 4 of the housing 1. As a rule, the filler 18 will be inserted into the trailing end of the housing 1, as considered in the direction (arrow A in FIG. 3) in which the housing is being transported in the slide projector. Furthermore, the spring 6 of FIG. 7 can be omitted if the housing 1 accommodates one or more fillers 18.

Figure 8:
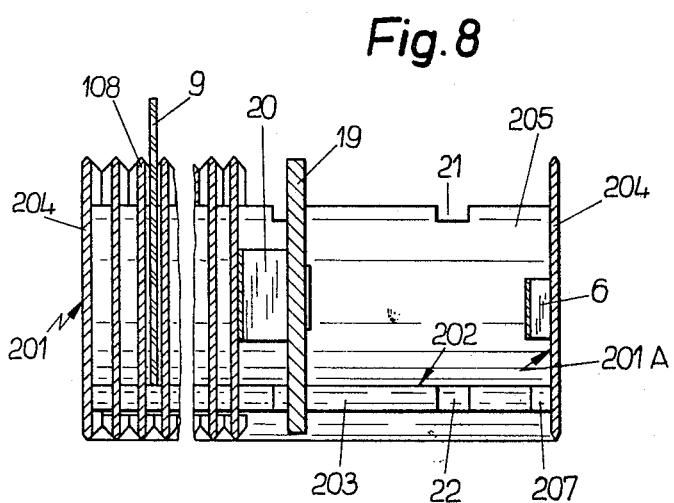
FIG. 8 is a similar fragmentary longitudinal vertical sectional view of a third tray.

FIG. 8 illustrates a modified filler or condensing member which comprises a single auxiliary partition 19 and a leaf spring 20 operating between the partition 19 and the nearest outermost partition 108. The auxiliary partition 19 is insertable at several longitudinally spaced points of the housing 201, namely, wherever the housing is provided with pairs of transversely aligned upper recesses or dents 21 formed in the flanges of the side walls 205 and with pairs of transversely aligned lower recesses or dents 22 formed in the bottom wall 202 adjacent to the slot 203. The filler of FIG. 8 is used when the length of a package consisting of slides 9 and partitions 108 (or 8) is but a small fraction of the length of the space 201A in the housing 201. The dents 21, 22 may be provided at equal or different intervals.

The fillers shown in FIGS. 7 and 8 can be used with advantage when the housing 1 or 201 is rather long so that it can accommodate a relatively large number of slides (for example, fifty slides or more) and if the number of partitions and slides in a package is such that such package fills a relatively small fraction of the internal space 1A or 201A, for example, one-half or one-third of this space. In such instances, the spring or springs 6 at the one or both ends of the space 1A or 201A do not suffice to prevent uncontrolled tilting of slides in the respective compartments and to insure proper operation of transporting and slide changing mechanisms in the projector. Of course, and as stated before, the use of fillers can be avoided if the space 1A or 201A is substantially filled with slides and/or partitions, i.e., if the user inserts such a number of partitions 8 or 108 that the resulting package occupies almost the entire space 1A or 210A even if the package contains a relatively small number of slides, namely, a number which is considerably less than the number of partitions. However, such mode of filling the housing 1 or 201 might involve much work which is not needed if the user resorts to a filler of the type shown in FIGS. 7 or 8. The difference between the partitions 8 or 108 and partition 19 is that the latter is insertable or removable from the housing 201 but cannot be shifted lengthwise of the space 201A. The provision of spring 20 on the partition 19 constitutes an optional feature of the filler shown in FIG. 8, particularly if the left-hand end wall 204 of the housing 201 is provided with a spring 6.

The filler 18 of FIG. 7 is particularly suited for use in relatively short trays.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims.

What is claimed is:

1. A tray for framed photographic transparencies comprising an elongated housing open at one side and defiing an elongated space into which transparencies may be inserted and removed from said space, said housing being provided in a wall thereof with a slot extending substantially through the length thereof; a plurality of partitions received in said housing extending transversely through said space, said partitions defining between themselves compartments each arranged to accommodate a transparency and each of said partitions comprising a projection extending through said slot from said housing and having an end portion tapering away from said housing so that the end portions of projections on adjacent partitions may cooperate with detector means of a slide projector; and cooperating means on said housing and said partitions permitting movement of the latter in the longitudinal direction of said housing while preventing movement of said partitions in a direction tranvserse to said longitudinal direction.

2. A tray as defined in claim 1, wherein said open side is provided at the top of said housing and wherein said wall provided with said slot is the bottom wall of said housing.

3. A tray as defined in claim 2, wherein said cooperating means comprise a recess in each partition located above said end portion of the respective projection and a portion of said bottom wall adjacent said slot and received in said recess.

4. A tray as defined in claim 2, wherein said projections extend downwardly through said slot in said bottom wall and are arranged to cooperate with vertically reciprocable detector means of a slide projector.

5. A tray as defined in claim 1, wherein said housing comprises a pair of elongated side walls and each of said partitions comprises two laterally extending arms overlying and slidable along said side walls.

6. A tray as defined in claim 1, wherein said housing has an open upper side and each of said partitions comprises an upper part having a pair of upwardly converging side faces to facilitate insertion of transparencies into the respective compartments.

7. A tray as defined in claim 6, wherein said side faces extend transversely across the full width of said housing.

8. A tray as defined in claim 6, wherein each of said upper parts comprises two spaced end poritons whose thickness exceeds the thickness of the remainder of the respective upper part.

9. A tray defined in claim 8, wherein the end portions of adjoining partitions are movable into abutment with each other to determine the maximum width of said compartments.

10. A tray as defined in claim 1, wherein each of said partitions is removable from said housing in at least one predetermined position with reference to said housing.

11. A tray as defined in claim 10, wherein said housing has a bottom wall provided with said elongated slot and with at least one cutout extending laterally of said slot, each of said projections having a laterally extending end portion adapted to pass through said cutout when the respective partition is moved to said predetermined position.

12. A tray as defined in claim 1, wherein said partitions include two outermost partitions and further comprising condensing means for biasing at least one of said outermost partitions in a direction toward the other outermost partition.

13. A tray as defined in claim 12, wherein said condensing means comprises resilient means operating between said one outermost partition and said housing.

14. A tray as defined in claim 13, wherein said housing comprises a pair of elongated side walls and a pair of end walls, said resilient means operating between said one outermost partition and one of said end walls.

15. A tray as defined in claim 12, wherein said housing comprises a pair of elongated side walls flanking said space and said condensing means comprises an auxiliary partition adapted to be coupled to said side walls adjacent to one of said outermost partitions.

16. A tray as defined in claim 15, wherein said condensing means further comprises resilient means operating between said one outermost partition and said auxiliary partition,

17. A tray as defined in claim 16, wherein said side walls are provided with transversely aligned dents and said auxiliary partition comprises portions removably receivable in selected dents of said side walls.

18. A tray as defined in claim 17, wherein said housing further comprises a bottom wall provided with dents registering with the dents of said side walls and said auxiliary partition comprises additional portions receivable in the dents of said bottom wall.

19. A tray as defined in claim 17, wherein the dents in each of said side walls are located at a predetermined distance from each other.

20. A tray as defined in claim 12, wherein said condensing means comprises two auxiliary partitions inserted into one end of said space and resilient means operating between said auxiliary partitions to bias one thereof against said housing and the other thereof against said one outermost partition.

21. A tray as defined in claim 4, wherein said housing is further provided with means for facilitating its transportation in the longitudinal direction of said space to place selected compartments into registry with the detector.

22. A tray as defined in claim 21, wherein said transportation facilitating means is arranged to facilitate movements of the housing by increments of identical length.

References Cited

UNITED STATES PATENTS

| | | | |
|---|---|---|---|
| 386,673 | 7/1888 | Wells | 206—73 |
| 1,874,950 | 8/1932 | Forsyth | 206—73 |
| 3,027,666 | 4/1962 | Briskin | 206—73 |

SAMUEL S. MATTHEWS, Primary Examiner